(12) United States Patent
Janover et al.

(10) Patent No.: US 12,536,503 B1
(45) Date of Patent: Jan. 27, 2026

(54) SYSTEMS AND METHODS TO TRACK AND PRESENT NAVIGATION THROUGH RECORDS OF A COLLABORATION ENVIRONMENT

(71) Applicant: ASANA, INC., San Francisco, CA (US)

(72) Inventors: Ariel Janover, Brooklyn, NY (US); Hannah Clark Peckham, Brooklyn, NY (US); Irma Qamar Nomani, West Babylon, NY (US); Kasra Koushan, New York, NY (US)

(73) Assignee: Asana, Inc., San Francisco, CA (US)

( * ) Notice: Subject to any disclaimer, the term of this patent is extended or adjusted under 35 U.S.C. 154(b) by 985 days.

(21) Appl. No.: 17/542,919

(22) Filed: Dec. 6, 2021

(51) Int. Cl.
*G06Q 10/10* (2023.01)

(52) U.S. Cl.
CPC ................. *G06Q 10/103* (2013.01)

(58) Field of Classification Search
None
See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,530,861 A | 6/1996 | Diamant |
| 5,548,506 A | 8/1996 | Srinivasan |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,578,004 B1 | 6/2003 | Cimral |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

ASANA website; Mar. 12, 2020 (https://web.archive.org/web/20200312140636/https://asana.com/guide/help/) (see attached pdf for sublinks) (Year: 2020).*

(Continued)

*Primary Examiner* — Laura Yesildag
(74) *Attorney, Agent, or Firm* — Esplin & Associates, PC

(57) ABSTRACT

Systems and methods to track and present navigation through records of a collaboration environment are described herein. Exemplary implementations may: manage environment state information maintaining a collaboration environment; monitor user input into instances of a user interface of the collaboration environment; generate navigation history information based on monitoring the user input, the navigation history information identifying an ordered series of user interface pages access by the users; effectuate presentation of navigation interface elements within the instances of the user interface based on the navigation history information; and/or perform other operations.

20 Claims, 4 Drawing Sheets

(56) References Cited

U.S. PATENT DOCUMENTS

| | | |
|---|---|---|
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,613,688 B2 | 11/2009 | Wiest |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,991,632 B1 | 8/2011 | Morris |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,352,310 B1 | 1/2013 | Bessler |
| 8,365,065 B2 | 1/2013 | Gejdos |
| 8,499,300 B2 | 7/2013 | Zimberg |
| 8,522,240 B1 | 8/2013 | Merwarth |
| 8,527,287 B1 | 9/2013 | Bhatia |
| 8,531,447 B2 | 9/2013 | Walker |
| 8,554,832 B1 | 10/2013 | Moskovitz |
| 8,572,477 B1 | 10/2013 | Moskovitz |
| 8,583,579 B1 | 11/2013 | Seth |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 8,909,631 B1 | 12/2014 | Seth |
| 8,938,690 B1 | 1/2015 | Khouri |
| 9,009,096 B2 | 4/2015 | Pinckney |
| 9,024,752 B1 | 5/2015 | Tumayan |
| 9,122,834 B1 | 9/2015 | Caluya |
| 9,143,839 B2 | 9/2015 | Reisman |
| 9,152,668 B1 | 10/2015 | Moskovitz |
| 9,189,756 B2 | 11/2015 | Gilbert |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,372,596 B2 | 6/2016 | Breedvelt-Schouten |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,836,183 B1 | 12/2017 | Love |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,423,927 B2 | 9/2019 | Hamilton |
| 10,454,911 B2 | 10/2019 | Hanhirova |
| 10,455,011 B2 | 10/2019 | Kendall |
| 10,496,943 B2 | 12/2019 | De |
| 10,586,211 B2 | 3/2020 | Steplyk |
| 10,594,788 B2 | 3/2020 | Larabie-Belanger |
| 10,606,859 B2 | 3/2020 | Smith |
| 10,613,735 B1 | 4/2020 | Karpe |
| 10,614,404 B2 | 4/2020 | Guo |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 * | 9/2020 | Raghavan ............ G06Q 10/103 |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,443,281 B2 | 9/2022 | Culver |
| 11,500,620 B2 | 11/2022 | Scolnick |
| 11,501,063 B2 | 11/2022 | Norota |
| 11,657,306 B2 | 5/2023 | Aggarwal |
| 11,720,858 B2 | 8/2023 | Clifton |
| 11,769,115 B1 | 9/2023 | Morales |
| 12,093,896 B1 | 9/2024 | Beauchamp |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0101086 A1 * | 5/2003 | San Miguel ...... G06Q 10/06311 |
| | | 705/7.36 |
| 2003/0106039 A1 | 6/2003 | Rosnow |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0122693 A1 | 6/2004 | Hatscher |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0233235 A1 * | 11/2004 | Rubin ................. G06F 16/9562 |
| | | 715/738 |
| 2004/0268451 A1 | 12/2004 | Robbin |
| 2005/0027582 A1 | 2/2005 | Chereau |
| 2005/0210394 A1 | 9/2005 | Crandall |
| 2005/0216111 A1 | 9/2005 | Ooshima |
| 2005/0216830 A1 | 9/2005 | Turner |

(56) References Cited

U.S. PATENT DOCUMENTS

| | | |
|---|---|---|
| 2005/0222971 A1 | 10/2005 | Cary |
| 2005/0234886 A1 | 10/2005 | Mohraz |
| 2005/0262081 A1 | 11/2005 | Newman |
| 2006/0028917 A1 | 2/2006 | Wigginton |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0239573 A1 | 10/2007 | Tien |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0033876 A1 | 2/2008 | Goldman |
| 2008/0034314 A1 | 2/2008 | Louch |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0133736 A1 | 6/2008 | Wensley |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313110 A1 | 12/2008 | Kreamer |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199113 A1 | 8/2009 | Mcwhinnie |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0235182 A1 | 9/2009 | Kagawa |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0100594 A1 | 4/2010 | Frees |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0169832 A1 * | 7/2010 | Chang .................. G06F 16/954 715/811 |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0306007 A1 | 12/2010 | Ganapathyraj |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0258582 A1 | 10/2011 | Bang |
| 2011/0265188 A1 | 10/2011 | Ramaswamy |
| 2011/0270644 A1 | 11/2011 | Roncolato |
| 2011/0302003 A1 | 12/2011 | Shirish |
| 2011/0307100 A1 | 12/2011 | Schmidtke |
| 2011/0307771 A1 | 12/2011 | Lok |
| 2011/0307772 A1 | 12/2011 | Lloyd |
| 2012/0030194 A1 | 2/2012 | Jain |
| 2012/0035942 A1 | 2/2012 | Graupner |
| 2012/0041983 A1 | 2/2012 | Jennings |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0210247 A1 | 8/2012 | Khouri |
| 2012/0221963 A1 | 8/2012 | Motoyama |
| 2012/0226617 A1 | 9/2012 | Kay |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0073963 A1 | 3/2013 | Pendergast |
| 2013/0080919 A1 | 3/2013 | Kiang |
| 2013/0103412 A1 | 4/2013 | Nudd |

(56) References Cited

U.S. PATENT DOCUMENTS

| | | |
|---|---|---|
| 2013/0124254 A1 | 5/2013 | Jafri |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0198676 A1 | 8/2013 | Garrett |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0012616 A1 | 1/2014 | Moshenek |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0075004 A1 | 3/2014 | Van Dusen |
| 2014/0089719 A1 | 3/2014 | Daum |
| 2014/0101310 A1 | 4/2014 | Savage |
| 2014/0143000 A1 | 5/2014 | Kay |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0201131 A1 | 7/2014 | Burman |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0304836 A1 | 10/2014 | Velamoor |
| 2014/0310047 A1 | 10/2014 | De |
| 2014/0310051 A1 | 10/2014 | Meng |
| 2014/0337279 A1 | 11/2014 | Mo |
| 2014/0350997 A1 | 11/2014 | Holm |
| 2014/0364987 A1 | 12/2014 | Shikano |
| 2014/0372860 A1 | 12/2014 | Craven |
| 2015/0006448 A1 | 1/2015 | Gupta |
| 2015/0007058 A1 | 1/2015 | Wooten |
| 2015/0007336 A1 | 1/2015 | Zang |
| 2015/0012330 A1 | 1/2015 | Sugiura |
| 2015/0052437 A1 | 2/2015 | Crawford |
| 2015/0058053 A1 | 2/2015 | De |
| 2015/0098561 A1 | 4/2015 | Etison |
| 2015/0106736 A1 | 4/2015 | Torman |
| 2015/0113540 A1 | 4/2015 | Rabinovici |
| 2015/0134393 A1 | 5/2015 | De |
| 2015/0153906 A1 | 6/2015 | Liao |
| 2015/0193735 A1 | 7/2015 | Lavrov |
| 2015/0213411 A1 | 7/2015 | Swanson |
| 2015/0215256 A1 | 7/2015 | Ghafourifar |
| 2015/0262111 A1 | 9/2015 | Yu |
| 2015/0294253 A1 | 10/2015 | Bhat |
| 2015/0312113 A1 | 10/2015 | Forutanpour |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363481 A1 | 12/2015 | Haynes |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0216854 A1 | 7/2016 | Mcclellan |
| 2016/0224939 A1 | 8/2016 | Chen |
| 2016/0234391 A1 | 8/2016 | Wolthuis |
| 2016/0241609 A1 | 8/2016 | Xin |
| 2016/0275068 A1 | 9/2016 | Wenzel |
| 2016/0275436 A1 | 9/2016 | Kurjanowicz |
| 2016/0307210 A1 | 10/2016 | Agarwal |
| 2016/0313934 A1 | 10/2016 | Isherwood |
| 2016/0328217 A1 | 11/2016 | Hagerty |
| 2016/0342927 A1 | 11/2016 | Reznik |
| 2016/0352812 A1 * | 12/2016 | Ahlgren .................. G06Q 10/10 |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0206501 A1 | 7/2017 | Wang |
| 2017/0249574 A1 | 8/2017 | Knijnik |
| 2017/0249577 A1 | 8/2017 | Nishikawa |
| 2017/0262294 A1 | 9/2017 | Yakan |
| 2017/0316358 A1 | 11/2017 | Candito |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0337517 A1 | 11/2017 | Defusco |
| 2017/0344754 A1 | 11/2017 | Kumar |
| 2017/0346861 A1 | 11/2017 | Pearl |
| 2017/0351385 A1 | 12/2017 | Ertmann |
| 2017/0364214 A1 | 12/2017 | Javed |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0082255 A1 | 3/2018 | Rosati |
| 2018/0088754 A1 | 3/2018 | Psenka |
| 2018/0089625 A1 | 3/2018 | Rosati |
| 2018/0095938 A1 | 4/2018 | Monte |
| 2018/0101807 A1 | 4/2018 | Ni |
| 2018/0102989 A1 | 4/2018 | Borsutsky |

(56) References Cited

U.S. PATENT DOCUMENTS

| | | |
|---|---|---|
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189735 A1 | 7/2018 | Lo |
| 2018/0189736 A1 | 7/2018 | Guo |
| 2018/0190145 A1 | 7/2018 | Nakayama |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0285746 A1 | 10/2018 | Dunwoody |
| 2018/0300305 A1 | 10/2018 | Lam |
| 2018/0316636 A1 | 11/2018 | Kamat |
| 2018/0331842 A1 | 11/2018 | Faulkner |
| 2018/0336520 A1 | 11/2018 | Davis |
| 2018/0349108 A1 | 12/2018 | Brebner |
| 2018/0349829 A1 | 12/2018 | Peterson |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0089581 A1 | 3/2019 | Purandare |
| 2019/0095839 A1 | 3/2019 | Itabayashi |
| 2019/0095846 A1 | 3/2019 | Gupta |
| 2019/0102071 A1 | 4/2019 | Redkina |
| 2019/0102364 A1 | 4/2019 | Rochiramani |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0220936 A1 | 7/2019 | Khalil |
| 2019/0265821 A1 | 8/2019 | Pearl |
| 2019/0286462 A1 | 9/2019 | Bodnick |
| 2019/0318285 A1 | 10/2019 | Sebilleau |
| 2019/0340296 A1 | 11/2019 | Cunico |
| 2019/0340518 A1 | 11/2019 | Merrill |
| 2019/0340554 A1 | 11/2019 | Dotan-Cohen |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0347515 A1 | 11/2019 | Kehl |
| 2019/0370320 A1 | 12/2019 | Kalra |
| 2020/0005241 A1 | 1/2020 | Westwood |
| 2020/0019907 A1 | 1/2020 | Notani |
| 2020/0059539 A1 | 2/2020 | Wang |
| 2020/0065736 A1 | 2/2020 | Relangi |
| 2020/0145239 A1 | 5/2020 | Ghods |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0035069 A1 | 2/2021 | Parikh |
| 2021/0049555 A1 | 2/2021 | Shor |
| 2021/0073697 A1 | 3/2021 | Paranjape |
| 2021/0097466 A1 | 4/2021 | Sabo |
| 2021/0097490 A1 | 4/2021 | Ratcliff |
| 2021/0103451 A1 | 4/2021 | Sabo |
| 2021/0110347 A1 | 4/2021 | Khalil |
| 2021/0133162 A1 | 5/2021 | Arnold |
| 2021/0136012 A1 | 5/2021 | Barbitta |
| 2021/0141996 A1 | 5/2021 | Agrawal |
| 2021/0149925 A1 | 5/2021 | Mann |
| 2021/0157978 A1 | 5/2021 | Haramati |
| 2021/0182475 A1 | 6/2021 | Pelz |
| 2021/0192129 A1 | 6/2021 | Garg |
| 2021/0209239 A1 | 7/2021 | Robinson |
| 2021/0209535 A1 | 7/2021 | Tezak |
| 2021/0216562 A1 | 7/2021 | Smith |
| 2021/0232282 A1 | 7/2021 | Karpe |
| 2021/0248304 A1 | 8/2021 | Olivier |
| 2021/0320891 A1 | 10/2021 | Rosenstein |
| 2021/0342361 A1 | 11/2021 | Radzewsky |
| 2021/0342785 A1 | 11/2021 | Mann |
| 2021/0342786 A1 | 11/2021 | Jiang |
| 2021/0382734 A1 | 12/2021 | Rosenstein |
| 2022/0019320 A1 | 1/2022 | Sabo |
| 2022/0019959 A1 | 1/2022 | Roy |
| 2022/0029886 A1 | 1/2022 | Hameiri |
| 2022/0058334 A1 | 2/2022 | Joshi |
| 2022/0058548 A1 | 2/2022 | Garg |
| 2022/0075792 A1 | 3/2022 | Koch |
| 2022/0078142 A1 | 3/2022 | Cameron |
| 2022/0101235 A1 | 3/2022 | Khalil |
| 2022/0158859 A1 | 5/2022 | Raghavan |
| 2022/0215315 A1 | 7/2022 | Sabo |
| 2022/0309037 A1 | 9/2022 | Gutierrez |
| 2022/0391921 A1 | 12/2022 | Wilner |
| 2023/0061905 A1* | 3/2023 | Culver .................. G06F 30/13 |
| 2023/0214509 A1 | 7/2023 | Kahawala |
| 2023/0252415 A1 | 8/2023 | Ackerman-Greenberg |
| 2023/0267419 A1 | 8/2023 | Beauchamp |
| 2023/0306370 A1 | 9/2023 | Clifton |
| 2023/0343027 A1 | 10/2023 | Cazamias |
| 2024/0013153 A1 | 1/2024 | Jiang |
| 2024/0019993 A1 | 1/2024 | Rosenstein |
| 2024/0171621 A1 | 5/2024 | Ye |
| 2024/0220930 A1 | 7/2024 | Clifton |
| 2024/0310990 A1 | 9/2024 | Beauchamp |
| 2024/0346449 A1 | 10/2024 | Beauchamp |
| 2024/0386382 A1 | 11/2024 | Adams |
| 2024/0420086 A1 | 12/2024 | Beauchamp |
| 2025/0036863 A1 | 1/2025 | Davies |

FOREIGN PATENT DOCUMENTS

| | | |
|---|---|---|
| CN | 102378975 B | 5/2015 |
| JP | 3973263 B2 | 9/2007 |
| JP | 2008059035 A | 3/2008 |
| JP | 4315508 B2 | 8/2009 |
| JP | 4335340 B2 | 9/2009 |
| KR | 101760051 B1 | 7/2017 |
| WO | 2007064690 A2 | 6/2007 |
| WO | 2015029073 A2 | 3/2015 |
| WO | 2015036817 A1 | 3/2015 |
| WO | 2015123751 A1 | 8/2015 |
| WO | 2016115621 A1 | 7/2016 |
| WO | 2020006634 A1 | 1/2020 |

OTHER PUBLICATIONS

N. S. Jyothi and A. Parkavi, "A study on task management system," 2016 International Conference on Research Advances in Integrated Navigation Systems (RAINS), Bangalore, India, 2016, pp. 1-6, doi: 10.1109/RAINS.2016.7764421. (Year: 2016).*

N. C. Romano, Fang Chen and J. F. Nunamaker, "Collaborative Project Management Software," Proceedings of the 35th Annual Hawaii International Conference on System Sciences, 2002, pp. 233-242, doi: 10.1109/HICSS.2002.993878.

Tsung-Yi Chen, Yuh-Min Chen, Hui-Chuan Chu, Developing a trust evaluation method between co-workers in virtual project team for

(56) References Cited

OTHER PUBLICATIONS enabling resource sharing and collaboration, Computers in Industry, vol. 59, Issue 6. (Year: 2008) 15 pages.

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Booch, Grady, and Alan W. Brown. "Collaborative development environments." Adv. Comput. 59.1 (2003): 1-27. (Year: 2003).

Heerwagen, Judith H., et al. "Collaborative knowledge work environments." Building research & information 32,6 (2004): 510-528. (Year: 2004).

Luff, Paul, Christian Heath, and David Greatbatch. "Tasks-in-interaction: paper and screen based documentation in collaborative activity." Proceedings of the 1992 ACM conference on Computer-supported cooperative work. 1992. (Year: 1992).

Shivakumar; Complete Guide to Digital Project Management; 2018; Apress; (https://doi.org/10.1007/978-1-4842-3417-4; last access Mar. 6, 2023).

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.org/web/20160101054536/https://asana.com/press and https://web.archive.org/web/20160101054527/https://asana.com/product) (Year: 2016) 15 pages.

"U.S. Appl. No. 14/584,750, Examiner Interview Summary mailed Feb. 25, 2016", 3 pgs.

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https:// www.youtube.com/watch?v=TLOruY1KyxU (Year: 2017), 13 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Hartmann, "TimeProjectscheduling with resource capacities and requests varying with time: a case study," 2013, Flexible services and manufacturing journal, vol. 25, No. 1, pp. 74-93 (Year: 2013).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTVVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLINMdv30 (Year: 2017) (24 pages).

How to Asana, Planning with Asana calendar, youtube excerpt, Feb. 14, 2017 https://www.youtube.com/watch?v=w816KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

(56) References Cited

OTHER PUBLICATIONS

Where does Asana fit in, archives org, Jul. 8, 2017 https://web.archive.org/web/20170708150928/https://asana.com/guide/resources/infosheets/where-does-asana-fit (Year: 2017) (5 pages).

www.cogmotive.com/blog/author/alan Alan Byrne: "Creating a company Shared Calendar in Office 365"; pp. 1-17; Sep. 10, 2013.

(Tiburca, Andrew) Best Team Calendar Applications for 2018-Toggl https://toggl.com/blog/best-team-calendar-applications-for-2018 (Year: 2017).

Macro, computer science, wikipedia, archives org Feb. 11, 2020 http://web.archive.org/web/20200211082902/https://en.wikipedia.org/wiki/Macro_(computer_science) (Year: 2020).

Dawei Li, "Deepcham: Collaborative Edge-Mediated Adaptive Deep Learning for Mobile Object Recognition", 2016, IEEE/ACM, pp. 64-76. (Year: 2016).

Klipfoliio. "What is a Project Management Dashboard?". Jan. 18, 2021. <https://web.archive.org/web/20210128061955/https://www.klipfolio.com/resources/articles/project-management-dashboard> (Year: 2021) 6 pages.

Tao, Xingyu, et al. "Distributed common data environment using blockchain and Interplanetary File System for secure BIM-based collaborative design." Automation in Construction 130 (2021): 103851. (Year: 2021) (pp. 1-22).

\* cited by examiner

SYSTEMS AND METHODS TO TRACK AND PRESENT NAVIGATION THROUGH RECORDS OF A COLLABORATION ENVIRONMENT

FIELD OF THE DISCLOSURE

The present disclosure relates to a technical field of managing networked computer components operating a virtual collaboration environment, in particular, tracking navigation through electronically stored records of information that make up the virtual collaboration environment and configuring user interfaces of the virtual collaboration environment with elements that convey navigation history.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner. Projects may be a way to organize groups of tasks. Portfolios may be a way to organize groups of projects.

SUMMARY

Hosting a web-based virtual collaboration environment poses many challenges. For example, operating the virtual collaboration environment may require precise ways of creation, storage, management, and/or provision of information that makes up the virtual collaboration environment. One way that operators look to improve the operation of the collaboration environment is to improve the user interfaces through which users access and/or navigate through electronic records that make up the virtual collaboration environment. For example, users may manually navigate through hierarchies of the records by accessing individual pages for the records, while moving up and/or down the hierarchies. In some instances, records may exist in more than one hierarchy. For example, a record may be "multi-homed" in multiple superior records as may be needed for different user's organizational needs. Because of this and other technical specifications with respect to the organization of the records, navigating backward and forward through hierarchies of records may pose new challenges. That is, if a user is navigating from a given superior record to a given subordinate record within a given hierarchy, and the given subordinate record is also present within another given hierarchy, navigating "backward" from the given subordinate record poses the question: which hierarchy should be used to navigate back through? Further, some users may want to be made aware that a given record is present within more than one other hierarchy.

The operators of the virtual collaboration environment are therefore tasked with creating a user interface and user interface experience that provides insight into a user's navigation through records given the possibility that the records may be part of more than one hierarchy.

One aspect of the present disclosure relates to a system configured to track and present navigation through records of a virtual collaboration environment (sometimes referred here simply as a "collaboration environment"). The records of the collaboration environment may include one or more record hierarchies that may specify a multi-tiered, hierarchical arrangement, with respect to sets of records. The records may include one or more of portfolios records, projects records, work unit records, and/or other items that make up the collaboration environment. A portfolio record may be superior to one or more project records and/or other portfolio records within a record hierarchy. A project record may be superior to one or more work unit records within a record hierarchy. User navigation through the one or more record hierarchies may include accessing user interface pages for the records. Some users may find it difficult to keep track of their position within the record hierarchies during navigation and/or understand which records were accessed. One or more implementations of the system and methods presented herein propose a solution of an improved user interface and navigation mechanisms that helps track, organize, and present the path (through the records of the collaboration environment) traversed by the user, in accordance with the record hierarchies.

One or more implementations of a system to track and present navigation through records of a collaboration environment may include one or more hardware processors configured by machine-readable instructions and/or other components. Executing the machine-readable instructions may cause the one or more hardware processors to facilitate tracking and presenting navigation through records of a collaboration environment. The machine-readable instructions may include one or more computer program components. The one or more computer program components may include one or more of an environment state component, a navigation component, a user interface component, and/or other components.

The environment state component may be configured to manage environment state information maintaining a collaboration environment and/or other information. The collaboration environment may be configured to facilitate interaction by users with the collaboration environment. The environment state information may include records and/or other information. The records may include one or more of work unit records, project records, portfolio records, objective records, and/or other records.

The work unit records may include work unit information associated with units of work managed, created, and/or assigned within the collaboration environment to the users who are expected to accomplish one or more actions to complete the units of work. The project records may include project information associated with projects created and/or managed within the collaboration environment. The portfolio records may include portfolio information associated with portfolios created and/or managed within the collaboration environment.

The records within the collaboration environment may be associated by record hierarchies. Individual ones of the record hierarchies may specify that individual ones of the records are subordinate to one or more other ones of the records. For example, a record hierarchy may specify that a work unit record is subordinate to a project record. A record hierarchy may specify that a project record and/or a portfolio records is subordinate to one or more other portfolio records. By way of non-limiting illustration, the records may include a first portfolio record for a first portfolio, a second portfolio record for a second portfolio, a third portfolio record for a third portfolio, and/or other records. A first record hierarchy may specify the second portfolio record is subordinate to the first portfolio record, and a second record hierarchy may specify the second portfolio record is concurrently subordinate to the third portfolio record. That is, the second portfolio record may be multi-homed within the third portfolio record and the first portfolio record.

The navigation component may be configured to monitor user input into instances of a user interface of the collaboration environment by the users via client computing platforms associated with the users. The user input may specify user navigation through user interface pages of the user interface of the collaboration environment through which users view and/or access the records in the record hierarchies. By way of non-limiting illustration, the user input may specify a first user navigation within a first instance of the user interface. The first user navigation may be from a first portfolio page of the first portfolio record to a second portfolio page of the second portfolio record in accordance with the first record hierarchy.

The navigation component may be configured to generate navigation history information based on monitoring the user input and/or other information. The navigation history information may identify an ordered series of the user interface pages accessed by the users via the instances of the user interface. The order services may be ordered based on when the user interface pages were accessed. By way of non-limiting illustration, the navigation history information may identify a first ordered series based on the first user navigation. The first ordered series may include access to the first portfolio page followed by the second portfolio page.

The user interface component may be configured to effectuate presentation of navigation interface elements and/or other user interface elements within the instances of the user interface based on the navigation history information and/or other information. Individual navigation interface elements may provide access to individual ones of the user interface pages in the ordered series of the user interface pages in accordance with individual ones of the record hierarchies. By way of non-limiting illustration, individual navigation interface elements may include links to individual ones of the user interface pages. The individual navigation interface elements may further provide access to other ones of the user interface pages for other ones of the records specified within other individual ones of the record hierarchies. Thus, a user may be able to navigate out of a current record hierarchy and into a different record hierarchy when a given record is multi-homed in multiple record hierarchies. By way of non-limiting illustration, a first set of navigation interface elements may be presented within the first instance of the user interface based on the first ordered series. The first set of navigation interface elements may include a first navigation interface element representing the first portfolio page and a second navigation interface element representing the second portfolio page. The second navigation interface element may further provide access to a third portfolio page of the third portfolio record by virtue of the second portfolio record being concurrently subordinate to the third portfolio record via the second record hierarchy. Selection of the second navigation interface element may take the user to the third portfolio page such that the user navigates out of the first record hierarchy and into the second record hierarchy.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
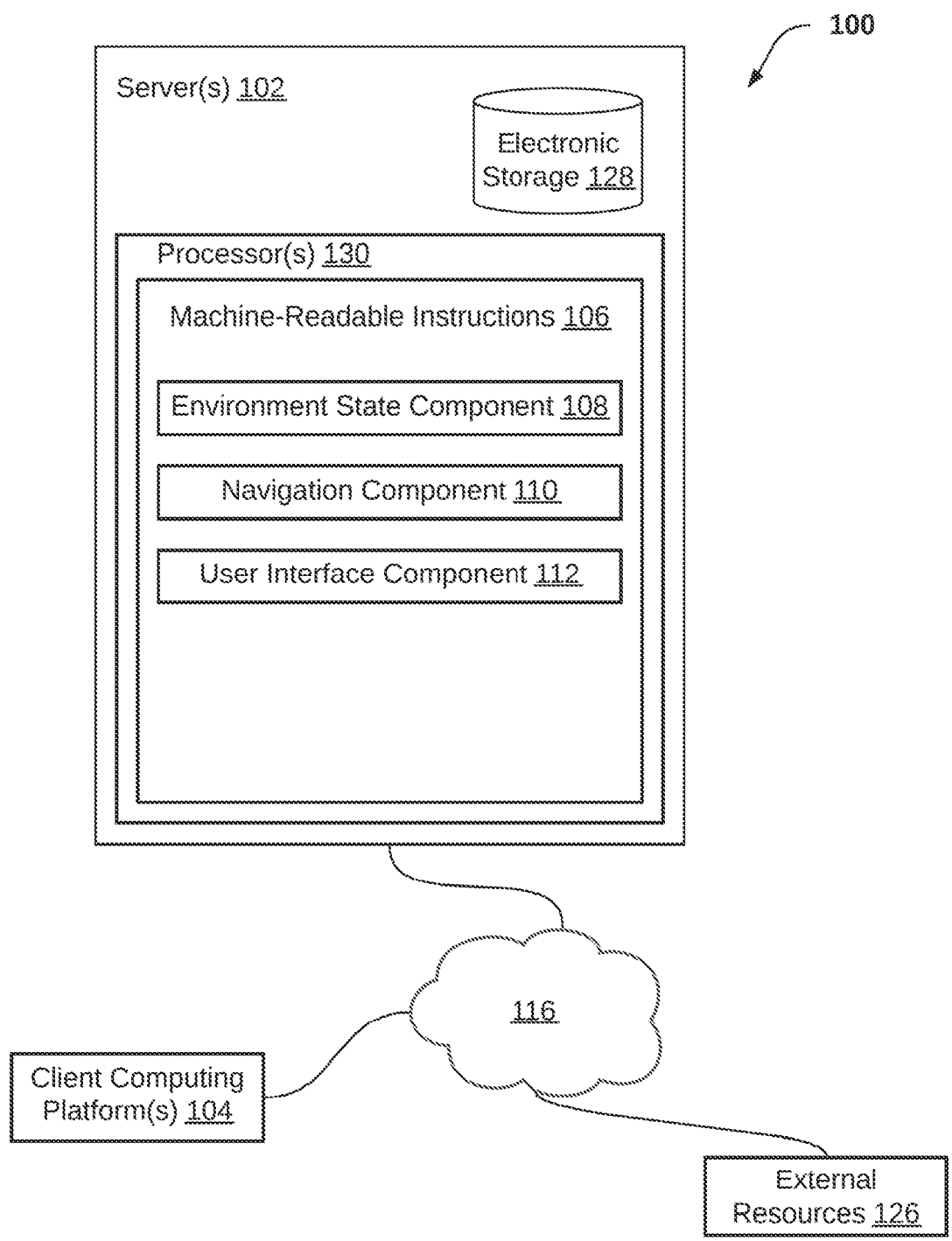
FIG. 1 illustrates a system configured to track and present navigation through records of a collaboration environment, in accordance with one or more implementations.

FIG. 1 illustrates a system 100 configured to track and present navigation through records of a collaboration environment, in accordance with one or more implementations. The collaboration environment may include one or more record hierarchies that specify a multi-tiered, hierarchical arrangement, with respect to one or more records that make up the collaboration environment. One or more implementations presented herein propose tracking and presenting user navigation through portfolios, projects, units of work, and/or other items according to the record hierarchies. The user interface may allow users to quickly view the path traversed during navigation from a starting page to a current page, as well as navigate into other record hierarchies to access other pages.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to track and present navigation through records of a collaboration environment. The computer program components may include one or more of an environment state component 108, a navigation component 110, a user interface component 112, and/or other components.

Environment state component 108 may be configured to establish a network connection (via network(s) 116) between the server(s) 102 and the client computing platforms(s) 104. Environment state component 108 may be configured to manage environment state information maintaining a collaboration environment and/or other information. The collaboration environment may be configured to facilitate interaction by users with the collaboration environment. The server(s) 102 may serve environment state information to client computing platform(s) 104 so that users may access, view, and/or edit the environment state information remotely via their client computing platform(s).

The environment state information may include records and/or other information. The records may include one or more of work unit records, project records, portfolio records, user records, objective records, and/or other records. The work unit records may include work unit information associated with units of work managed, created, and/or assigned within the collaboration environment to the users who are expected to accomplish one or more actions to complete the units of work. The project records may include project information associated with projects created and/or managed within the collaboration environment. The portfolio records may include portfolio information associated with portfolios created and/or managed within the collaboration environment. By way of non-limiting illustration, the records may include a first portfolio record for a first portfolio, a second portfolio record for a second portfolio, a third portfolio record for a third portfolio, and/or other records.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), progress information for one or more business objectives the user is associated with (business objectives owned by the user, of which the user is a collaborator, fulfilled by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, preference information, and/or other information.

The work unit information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, and/or other units of work one or more users should accomplish and/or plan on accomplishing in order to complete the units of work. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

In some implementations, the one or more work unit parameters may include one or more of a work assignment parameter, a work management parameter, work creation parameter, work completion parameter, and/or other parameters. The values of the work assignment parameter may describe assignment of units of work. The values of the work management parameter may describe manager(s) of the units of work. The values of the work creation parameter may describe creation of the units of work. The values of the work completion parameter may describe completion status of the units of work.

In some implementations, values of work unit parameters may include one or more of a unit of work name, a unit of work description, one or more unit of work dates (e.g., a start date, a due date or end date, a completion date, and/or dates), role information, a status parameter (e.g., an update, a hardcoded status update, a completed/incomplete/mark complete, a measured status, a progress indicator, quantity of sub-work units remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), one or more performance/productivity metrics for a given unit of work, permissions information, one or more custom fields (e.g., priority, cost, stage, and/or other custom fields), hierarchical information, and/or other information.

The values of the work assignment parameter describing assignment may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a status parameter of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 include maintaining queues of the units of work assigned to the users. The queues may be presented to the users in user-specific pages of the user interface of the collaboration environment to facilitate access to the units of work via work unit pages. A work unit page for a unit of work may comprise a user interface page and/or portion from which users access the work unit records, modify the work unit records, and/or perform other actions. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects created and/or managed within the collaboration environment. An individual project may be associated with an individual set of the units of work that support fulfilment of the project. An individual set of units of work of an individual project may be subordinate to the individual project, make up the individual project, and/or otherwise support the individual project. The individual set of units of work may directly facilitate progress toward fulfillment of the individual project. The individual set of units of work may directly contribute to the progress. By way of non-limiting illustration, a connection between the individual set of units of work and a corresponding individual project may be direct in that completion of at least one of the units of work may have a direct impact on progress toward fulfillment of the individual project. The concept of "direct impact" may mean that completion of the at least one unit of work may cause progress toward fulfillment of the individual project based on independent action completed and/or started with respect to the at least one unit of work. Accordingly, completion of an individual set of units of work may indicate that the individual project has been completed and/or fulfilled.

The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project.

The values of the project parameters may, by way of non-limiting example, include one or more of: one or more units of work associated with the project (which may include values of work unit parameters defined by one or more work unit records), one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, permissions information, state of a workspace for a given task within the given project, hierarchical information, and/or other information.

Portfolio information in portfolio records may define values of portfolio parameters for a portfolio managed within the collaboration environment. An individual portfolio may be associated with one or more projects and/or one or more other portfolios. A project of a portfolio may be subordinate to the portfolio, make up the portfolio, and/or otherwise be organized within the heading of the portfolio.

The portfolio parameters may characterize portfolios created and/or managed within the collaboration environment and/or via the collaboration environment, and/or the metadata associated with the portfolios. Individual ones of the portfolios may be associated with individual ones of the portfolios records. The portfolio information may define values of the portfolio parameters associated with a given portfolio managed within the collaboration environment and/or via the collaboration environment. A given portfolio may have one or more owners and/or one or more collaborators working on the given portfolio. In some implementations, a given portfolio may not have any owners and/or collaborators at the portfolio level other than those specified with respect to the records subordinate to the portfolio.

The values of the portfolio parameters may, by way of non-limiting example, include and/or specify one or more of: information about one or more projects associated with a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, permissions information (see, e.g., organization component 110), state of a workspace for a given project within the given portfolio, metadata associated with the portfolios, custom fields (e.g., values created by users), hierarchical information, and/or other information.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work, portfolios, and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with other records that may indirectly facilitate progress toward fulfillment of the business objectives. The set of records may not directly contribute to the progress. By way of non-limiting illustration, a connection between a set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with records that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with records that may indirectly (and/or directly) facilitate progress toward fulfillment of the user objectives. User objectives may be specified on an individual user basis.

Individual objective records may describe individual business objectives and/or identify sets of records that specify the work as being associated with the individual business objectives.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe ownership. The values of the objective management parameter may describe management. The values of the objective creation parameter may describe creation.

In some implementations, the business objectives may be described based on one or more of a business objective name, a business objective description, one or more business objective dates (e.g., a start date, a due date, and/or dates), one or more users associated with a business objective, progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), hierarchical information, and/or other information.

The values of the objective owner parameter describing ownership may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The records within the collaboration environment may include hierarchical information defining one or more record hierarchies. Individual ones of the record hierarchies may specify that individual ones of the records are subordinate to one or more other ones of the records. The individual ones of the project records and/or individual ones of the portfolio records may be subordinate to other individual ones of the portfolio records. The other individual ones of the portfolio records may include the individual ones of the project records and/or individual ones of the portfolio records by virtue of the individual ones of the project records and/or individual ones of the portfolio records being subordinate to the other individual ones of the portfolio records. For example, an individual portfolio record may be associated with one or more project records and/or portfolio records by virtue of the one or more project records and/or portfolio records being subordinate to the individual portfolio record within a record hierarchy.

In some implementations, a record hierarchy may define other relationships between records. By way of non-limiting illustration, a record may have some restrictions placed on it by virtue of having a subordinate record and/or superior record. By way of non-limiting illustration, a record may be restricted from access by one or more users unless and/or until a subordinate record is completed and/or started. In other words, a record may be dependent on a subordinate record.

In some implementations, the record hierarchies may specify that individual portfolio records are concurrently subordinate to more than one other portfolio record. This may be referred to as multi-homing of a portfolio record. In the case of multi-homing, the presence of a multi-homed record in multiple other superior records may comprise separate instances of the same record, albeit having access facilitated through the different superior records.

In some implementations, a record hierarchy specific to the portfolio records may automatically define relationships between the portfolio records. A portfolio record may have some restrictions placed on it by virtue of being subordinate to another portfolio record, and/or vice versa. By way of non-limiting illustration, a subordinate portfolio record may have access restrictions that conform to access restrictions of a superior portfolio record. For example, the access restrictions of a subordinate record may be modified so that they conform to access restrictions of a superior record. In some implementations, sets of values of permission parameters of the individual portfolio records may be determined based on the other individual ones of the portfolio records they are subordinate to. That is, adding a portfolio to an other portfolio may cause the portfolio to take on the values of the permission parameters of the other portfolio. Accordingly, features that may be enabled and/or disabled in a superior portfolio record may be similarly enabled and/or disabled in a subordinate portfolio record. In some implementations adding and/or removing a portfolio to and from another portfolio may be facilitated by drag-and-drop input in a user interface, and/or other input. This may allow users to nest (i.e., make subordinate, or "multi-home") portfolio records within other portfolio records without worrying about violating permissions that may otherwise set access restrictions. However, in some implementations, a portfolio record may not have restrictions placed on it by virtue of being subordinate to another portfolio record.

In some implementations, the record hierarchies may specify work unit hierarchies. A work unit hierarchy may convey individual positions of work unit records (and their corresponding units of work) in a record hierarchy comprising solely of work unit records. By way of non-limiting illustration, a position may specify one or more of a work unit record being superior to another work unit record, a work unit record being subordinate to another work unit record, and/or other information. As a result, individual work units of work in the individual sets of work unit records may be subordinate to other individual work unit records in the individual sets of work unit records. For example, a work unit record may define a unit of work comprising a task, and a subordinate work unit record may define a unit of work comprising a sub-task to the task. An individual record hierarchy may define a relationship between work unit records. A work unit record may have some restrictions placed on it by virtue of having a subordinate work unit record, and vice versa. By way of non-limiting illustration, a work unit record may be restricted from access by one or more users unless and/or until a subordinate work unit record is completed and/or started.

In some implementations, the record hierarchies may specify objective record hierarchies. Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records.

The user interface component 112 may be configured to effectuate presentation of a user interface of the collaboration environment on client computing platform(s) 104 associated with the users. Users, via client computing platform(s) 104, may log in to a web portal and/or application for the collaboration environment thereby generating a request to access the collaboration environment. The user interface component 112 may be configured to, in response to the requests, effectuate communication of environment state information and/or other information to the client computing platform(s) 104 via network(s) 116.

In some implementations, user's may interact with the collaboration environment and/or other users via the user interface of the collaboration environment. A set of user interface elements may be provided on the user interface to facilitate the user input and/or other user interaction within the user interface. The user interface elements may include one or more of text input fields, drop-down menus, check boxes, display windows, virtual buttons, and/or other elements configured to facilitate user interaction.

The user interface component 112 may be configured to effectuate presentation of user interface pages of the user interface of the collaboration environment on client computing platform(s) 104. The user interface pages may provide a mechanism in which users view and/or access the records in the record hierarchies. Accessing the records may allow users to interact with the information in the records. The user interaction may include one or more of modifying existing information in the records, adding new information in the records, deleting information in the records, and/or other types of interactions. User interface pages may include portfolio pages for portfolio records, project pages for project records, work unit pages for work unit records, and/or other types of pages for other types of records. In some implementations, a user interface page for an individual record may provide access to other user interface pages of other individual records that may be subordinate to the individual record. For example, a user interface element (such as a virtual button) may appear in a user interface page for a record, and may represent a user interface page of a subordinate record. By way of non-limiting illustration, selection of the user interface element may cause the user interface page for the subordinate record to be presented.

In some implementations, user interface component 112 may be configured to obtain input information and/or other information. The input information may convey user input into a user interface presented on the client computing platform(s) 104. The input may convey the user interaction with the user interface.

In some implementations, user interaction with the user interface of the collaboration environment may include user navigation between user interface pages. Users may search for user interface pages through a search bar of the collaboration environment, access a user interface page from a queue of units of work, and/or through other types of user interactions. In some implementations, user navigation from a user interface page for an individual record to another user interface page for a subordinate record may characterize forward navigation through a record hierarchy. By way of non-limiting illustration, a first user navigation within a first instance of the user interface may include navigating from a first portfolio page of the first portfolio record to a second portfolio page of the second portfolio record in accordance with the first record hierarchy. The first user navigation from the first portfolio page to the second portfolio page may be characterized as forward navigation through the first record hierarchy. In some implementations, navigation from the second portfolio page back to the first portfolio page may be characterized as backward navigation through the first record hierarchy.

The individual portfolio pages for individual portfolio records may provide access to other records that may be subordinate to the individual portfolio records. The individual project pages for individual project records may provide access to other records that may be subordinate to the individual project records. The individual work unit pages for individual work unit records may provide access to other records that may be subordinate to the individual work unit records.

By way of non-limiting illustration, the first portfolio page for the first portfolio record may provide access to the first project record that is subordinate to the first portfolio record, the second portfolio record that is subordinate to the first portfolio record, and/or other content. In the case of multi-homing, a third portfolio page for the third portfolio record may provide access to one or more of the third project record that is subordinate to the third portfolio record, to the second portfolio record that is subordinate to the third portfolio record, and/or other content. The access to the second portfolio record via the third portfolio page may be separate and distinct from the access to the second portfolio record via the first portfolio page by virtue of utilizing separate instances of the second portfolio record.

The individual user interface pages for the individual records may include individual user interface elements representing individual subordinate records. Users may interact with the user interface pages through selection of the individual user interface elements representing individual records. By way of non-limiting illustration, selection of a user interface element representing a project record may effectuate presentation of a project page for the project record. The selection of a user interface element representing a portfolio record may effectuate presentation of a portfolio page for the portfolio record. In some implementations, providing access to individual project records from individual superior portfolio records may include navigating away from the individual portfolio pages of the individual superior portfolio records to individual project pages of the individual subordinate project records. In some implementations, providing access to the individual subordinate portfolio records from individual superior portfolio records includes navigating away from the individual portfolio pages of the individual superior portfolio records to other individual portfolio pages of the individual subordinate portfolio records.

The navigation component 110 may be configured to monitor user input into instances of a user interface of the collaboration environment. The instances of the user interface of the collaboration environment may be accessed by the users via client computing platforms 104 associated with the users. The user input may specify user navigation through user interface pages of the user interface of the collaboration environment. By way of non-limiting illustration, the user input may specify the first user navigation within the first instance of the user interface.

The navigation component 110 may be configured to generate navigation history information based on monitoring the user input and/or other information. The navigation history information may identify an ordered series of the user interface pages accessed by the users via the instances of the user interface. An ordered series may indicate the user interface pages in a temporal order in which they were accessed. In ordered series may be identified based on one or more sessions of user engagement with the collaboration environment. A session may be defined as a period of time (e.g., an hour, a workday, a week, etc.). A session may be defined based on a user being logged into the collaboration environment. By way of non-limiting illustration, a session may start when a user logs end, and may end when a user logs out). By way of non-limiting illustration, the navigation history information may identify a first ordered series based on the first user navigation. The first ordered series may include access to the first portfolio page followed by the second portfolio page.

The navigation component 110 may be configured to update the navigation history information based on continued monitoring of the user input and/or other information. An ordered series of the user interface pages may be updated as a user continues to navigate through the collaboration environment.

The user interface component 112 may be configured to effectuate presentation of navigation interface elements and/or other user interface elements within the instances of the user interface based on the navigation history information and/or other information. Individual navigation interface elements may provide access to individual ones of the user interface pages in the ordered series of the user interface pages in accordance with individual ones of the record hierarchies. By way of non-limiting illustration, a navigation interface element may be linked to a user interface page. The navigation interface elements may comprise one or more of virtual buttons, selectable text, and/or other elements within a user interface. In some implementations, the individual navigation interface elements may be selectable by the user. Selection of an individual navigation interface element within the instance of the user interface may effectuate presentation of the user interface page represented by the individual navigation interface element. In some implementations, as navigation history information is updated, additional navigation interface elements may be presented.

In some implementations, an individual navigation interface elements may provide access to one or more user interface pages in the ordered series of the user interface pages and/or to one or more user interface pages of other records in other hierarchies. In some implementations, the individual navigation interface elements may be selectable within the instances of the user interfaces. Selection of the individual navigation interface elements may effectuate presentation of the individual ones of the user interface pages corresponding to the individual ones of the records represented by the individual navigation interface elements.

A current user interface page may be the most recent (and/or last) user interface page accessed by the user. A prior user interface page may be a page that was navigated from. In some implementations, the individual navigation interface elements providing access to individual ones of the user interface pages in the ordered series of the user interface pages may be presented in a header and/or other portion of the user interface. In some implementations, selection of individual navigation interface elements within the instances of the user interface may characterize backward or forward navigation through the record hierarchies.

In some implementations, the individual navigation interface elements may further provide access to other ones of the user interface pages for other ones of the records specified within other individual ones of the record hierarchies. The other individual ones of the record hierarchies may be associated with individual records represented for individual user interface pages within the ordered series of user interface pages.

In some implementations, user interaction with an individual navigation interface element may effectuate presentation of an individual set of hierarchy navigation interface elements. The individual hierarchy navigation interface elements may provide the access to the individual ones of other user interface pages for the other ones of the records specified within the other individual ones of the record hierarchies. The individual hierarchy navigation interface elements may have the same and/or similar features and/or functionality as the individual navigation interface elements albeit they provide access to other record hierarchies. The individual set of hierarchy navigation interface elements may represent the individual ones of the user interface pages for the records specified within the other individual ones of the record hierarchies.

In some implementation, user interaction with individual navigation interface elements may include hovering a cursor over an individual navigation interface element, right-clicking on the individual navigation interface element, and/or other types of interactions. In some implementations, individual sets of hierarchy navigation interface elements may be presented as a drop-down list from an individual navigation interface elements, and/or other presentations.

By way of non-limiting illustration, a first set of navigation interface elements may be presented within the first instance of the user interface based on the first ordered series. The first set of navigation interface elements may include a first navigation interface element representing the first portfolio page and a second navigation interface element representing the second portfolio page. Selection of the first navigation interface element from the first set of navigation interface elements may effectuate presentation of the first portfolio page. In some implementations, responsive to the user input specifying user navigation from the first portfolio page to the second portfolio page, the current user interface page may be second portfolio page. In some implementations, the first set of navigation interface elements may be presented within a header and/or other portion of a user interface showing the second portfolio page.

In some implementations, selection of the first navigation interface element from the second portfolio page may characterize backward navigation through the first record hierarchy. Selection of the first navigation interface element may effectuate presentation of the first portfolio page.

In some implementations, the second navigation interface element may further provide access to a third portfolio page of the third portfolio record by virtue of the second portfolio record being concurrently subordinate to the third portfolio record via the second record hierarchy. A first user interaction with the second navigation interface element (representing the second portfolio page) may effectuate presentation of a first set of hierarchy navigation interface elements representing the second record hierarchy. The first set of hierarchy navigation interface elements may provide access to the individual ones of the user interface pages for the records specified within the second record hierarchy. In some implementations, the first set of hierarchy navigation interface elements may include a first hierarchy navigation interface element representing the third portfolio page of the third portfolio record and/or other user interface pages for other records in the second record hierarchy. In some implementations, the first set of hierarchy navigation interface elements may include a first hierarchy navigation interface element representing the third portfolio page of the third portfolio record.

In some implementations, user interface component 112 may be configured to effectuate presentation of user interface pages for records within a user interface of the collaboration environment in response to selection of one or more navigation interface elements.

User interface component 112 may be configured to provide access to (e.g., enable) and/or restrict access to (e.g., disable) features for the users based on record hierarchies and their impact on permissions information. User interface component 112 may be configured to determine whether or not the users have a certain set of features enabled based on their navigation to one or more records from one or more superior records.

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, historical work unit information, historical project information, historical portfolio information, historical objective information, user interaction history, historical hierarchy information, and/or other information.

Figure 3:
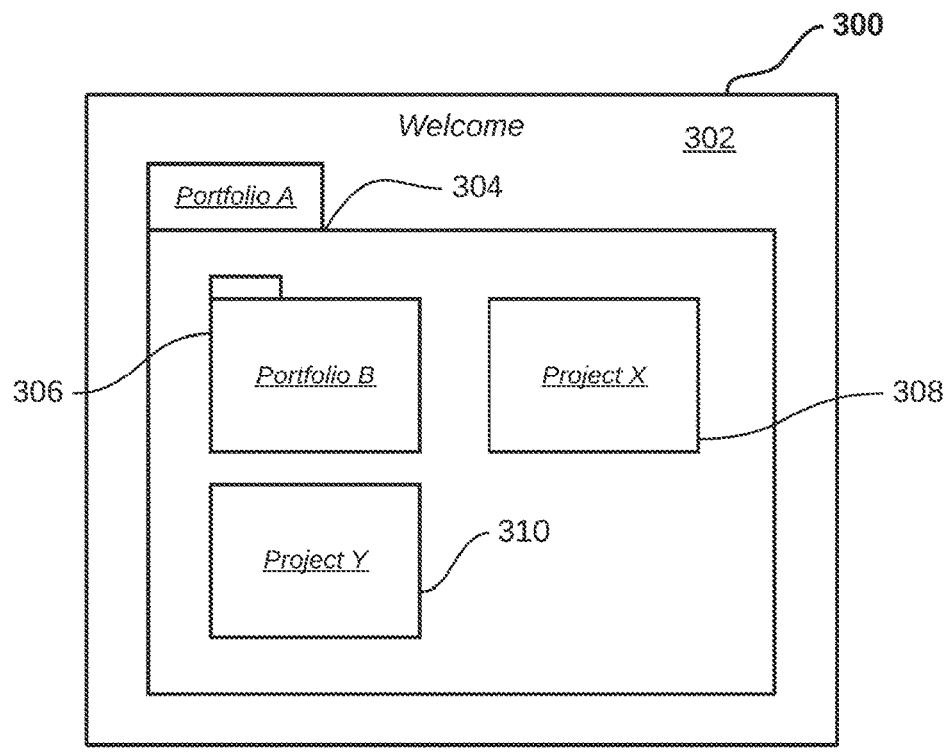
FIG. 3 illustrates a user interface, in accordance with one or more implementations.

FIG. 3 illustrates a user interface 300 of a collaboration environment, in accordance with one or more implementations. The user interface 300 may include a first portfolio page 302 for a first portfolio record of a first portfolio 304 (referred to as "Portfolio A"). A first record hierarchy may specify that one or more of a first project record for a first project 308 (referred to as "Project X") is subordinate to the first portfolio record for the first portfolio 304, a second project record for a second project 310 (referred to as "Project Y") is subordinate to the first portfolio record for the first portfolio 304, and/or that a second portfolio record for a second portfolio 306 (referred to as "Portfolio B") is subordinate to the first portfolio record for the first portfolio 304. The second portfolio record for the second portfolio 306 may also be concurrently subordinate to a third portfolio record for a third portfolio in accordance with a second record hierarchy.

The first portfolio page 302 of the first portfolio 304 may include individual user interface elements (e.g., selectable icons) representing individual ones of the first project 308, the second project 310, the second portfolio 306, and/or other content. Selection of an individual user interface element may effectuate presentation of respective ones of the user interface pages for the records.

Figure 4:
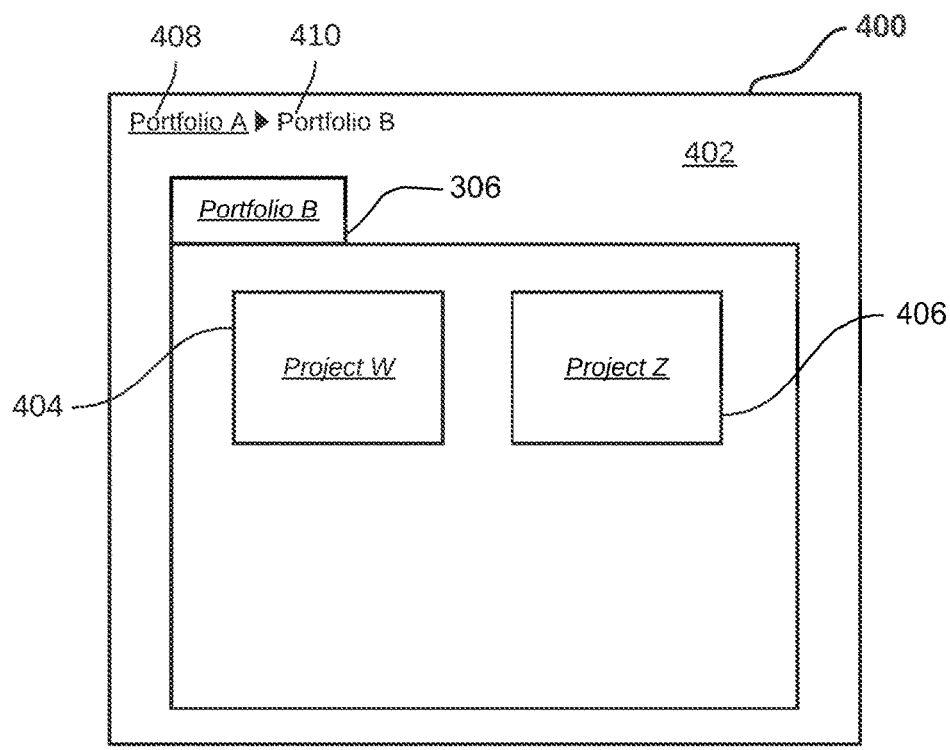
FIG. 4 illustrates a user interface, in accordance with one or more implementations.

FIG. 4 illustrates a user interface 400 of a collaboration environment, in accordance with one or more implementations. The user interface 400 may present a second portfolio page 402 for the second portfolio 306 ("Portfolio B"). The second portfolio page 402 may be presented in response to selection of the user interface element representing the second portfolio 306 from user interface 300 of FIG. 3. A first set of navigation interface elements may be presented to reflect the user navigation. By way of non-limiting illustration, the first set of navigation interface elements may include one or more of a first navigation interface element 408, a second navigation interface element 410, and/or other interface elements. The first set of navigation interface elements may provide access to individual user interface pages of a first ordered series of user interface pages. The first ordered series of user interface pages may include the first portfolio page 302 followed by the second portfolio page 402. The first navigation interface element 408 may facilitate navigation back to the first portfolio page 302, in accordance with the first record hierarchy. The first record hierarchy may specify that one or more of a third project record for a third project 404 (referred to as "Project W") is subordinate to the second portfolio record for the second portfolio 306, and/or a fourth project record for a fourth project 406 (referred to as "Project Z") is subordinate to the second portfolio record for the second portfolio 306.

Figure 5:
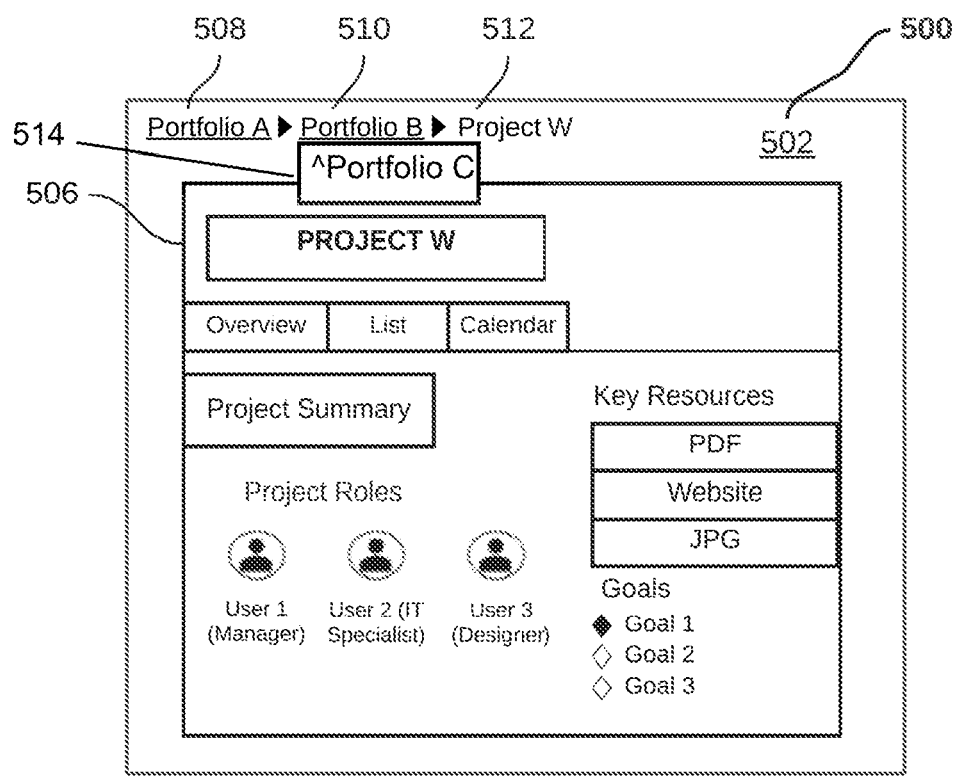
FIG. 5 illustrates a user interface, in accordance with one or more implementations.

FIG. 5 illustrates a user interface 500 of a collaboration environment, in accordance with one or more implementations. The user interface 500 may present a first project page 502 for the third project record of the third project 404 ("Project W"). The first project page 502 may be presented in response to selection of the user interface element representing the third project 404 from user interface 400 of FIG. 4. The first set of navigation interface elements may be updated based on the further user navigation. By way of non-limiting illustration, the first set of navigation interface elements may include one or more of the first navigation interface element 508, the second navigation interface element 510, a third navigation interface element 512, and/or other interface elements. The first set of navigation interface elements may provide access to individual user interface pages of the first ordered series of user interface pages, including the first project page 502 (represented by third navigation element 512). The first ordered series of user interface pages may include the first portfolio page 302 followed by the second portfolio page 402, and further followed by the first project page 502. The first navigation interface element 508 may facilitate navigation back to the first portfolio page 302 and the second navigation interface element 510 may facilitate navigation back to the second portfolio page 402, in accordance with the first record hierarchy.

In some implementations, user interaction with the second navigation interface element 510 (e.g., hovering a cursor) may effectuate presentation of a first set of hierarchy navigation interface elements 514 (illustrated by a drop-down menu) representing the second record hierarchy. By way of non-limiting illustration, the first set of hierarchy navigation interface elements 514 may include a first hierarchy navigation interface element representing the third portfolio page of the third portfolio record to show that the second portfolio is currently subordinate to the third portfolio record. Selection of the first hierarchy navigation interface element may effectuate presentation of the third portfolio page, thereby navigating the user out of the first record hierarchy and into the second record hierarchy.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
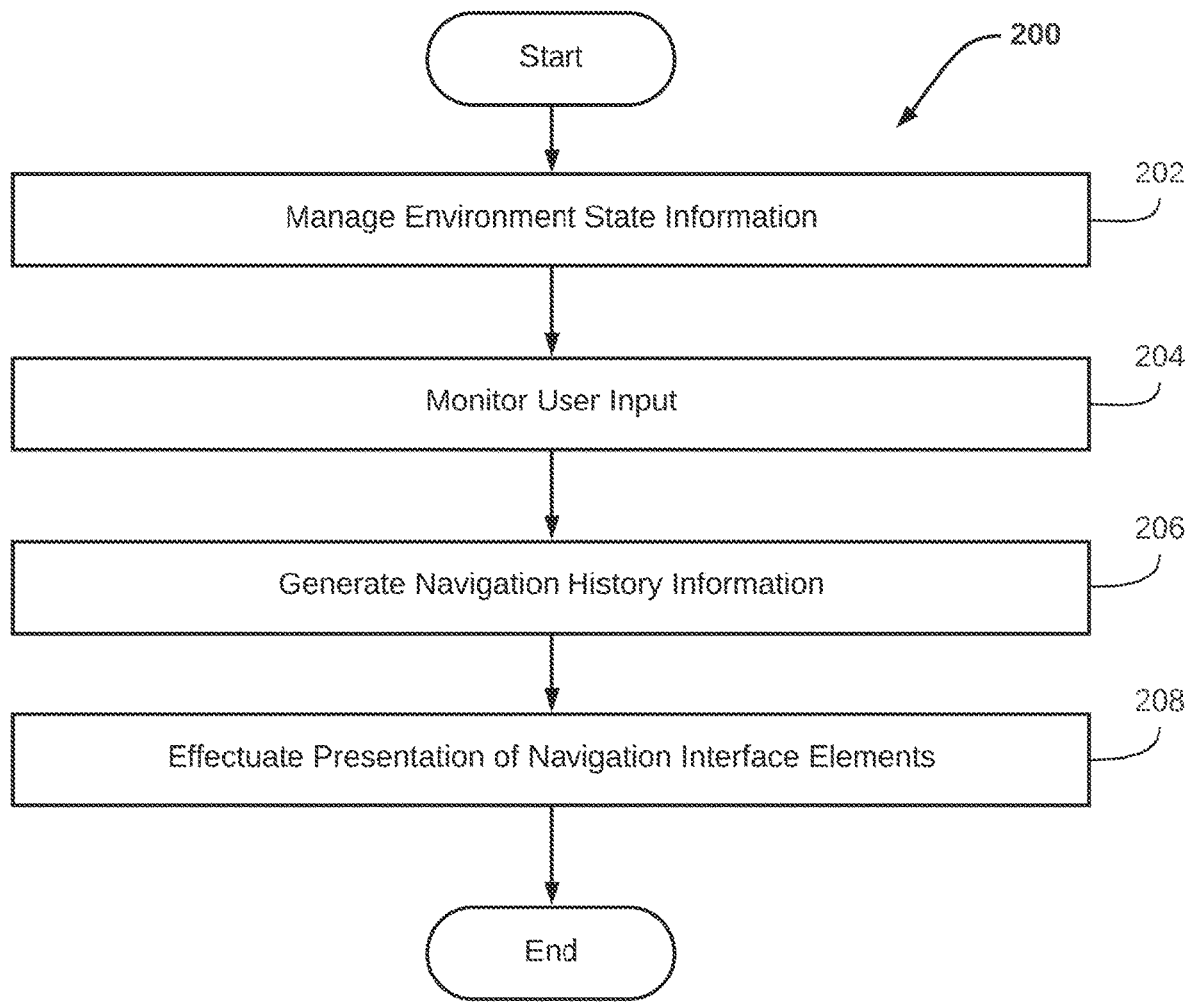
FIG. 2 illustrates a method to track and present navigation through records of a collaboration environment, in accordance with one or more implementations.

FIG. 2 illustrates a method 200 to track and present navigation through records of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include records and/or other information. The records may include work unit records, project records, portfolio records, and/or other records. The work unit records may include work unit information associated with units of work managed, created, and/or assigned within the collaboration environment to the users who are expected to accomplish one or more actions to complete the units of work. The project records may include project information associated with projects managed within the collaboration environment. The portfolio records may include portfolio information associated with portfolios managed within the collaboration environment. The records may be associated by record hierarchies. For example, individual ones of the record hierarchies may specify that individual ones of the work unit records are subordinate to individual ones of the project records. The individual ones of the project records and/or individual ones of the portfolio records are subordinate to other individual ones of the portfolio records. By way of non-limiting illustration, the records may include a first portfolio record for a first portfolio, a second portfolio record for a second portfolio, a third portfolio record for a third portfolio, and/or other records. A first record hierarchy may specify the second portfolio record is subordinate to the first portfolio record, and a second record hierarchy may specify the second portfolio record is concurrently subordinate to the third portfolio record. Operation 202 may be performed by one or more hardware processors configured by machine-readable instructions including a component that is the same as or similar to environment state component 108 (shown in FIG. 1 and described herein), in accordance with one or more implementations.

An operation 204 may monitor user input into instances of a user interface of the collaboration environment by the users via client computing platforms associated with the users. The user input may specify user navigation through user interface pages of the user interface of the collaboration environment through which users view and access the records in the record hierarchies. By way of non-limiting illustration, the user input may specify a first user navigation within a first instance of the user interface. The first user navigation may be from a first portfolio page of the first portfolio record to a second portfolio page of the second portfolio record in accordance with the first record hierarchy. Operation 204 may be performed by one or more hardware processors configured by machine-readable instructions including a component that is the same as or similar to navigation component 110 (shown in FIG. 1 and described herein), in accordance with one or more implementations.

An operation 206 may generate navigation history information based on monitoring the user input and/or other information. The navigation history information may identify an ordered series of the user interface pages accessed by the users via the instances of the user interface. By way of non-limiting illustration, the navigation history information may identify a first ordered series based on the first user navigation and/or other ordered series. The first ordered series may include access to the first portfolio page followed by the second portfolio page. Operation 206 may be performed by one or more hardware processors configured by machine-readable instructions including a component that is the same as or similar to navigation component 110 (shown in FIG. 1 and described herein), in accordance with one or more implementations.

An operation 208 may effectuate presentation of navigation interface elements and/or other user interface elements within the instances of the user interface based on the navigation history information and/or other information. Individual navigation interface elements may provide access to individual ones of the user interface pages in the ordered series of the user interface pages in accordance with individual ones of the record hierarchies. The individual navigation interface elements may further provide access to other ones of the user interface pages for other ones of the records specified within other individual ones of the record hierarchies. By way of non-limiting illustration, a first set of navigation interface elements may be presented within the first instance of the user interface based on the first ordered series. The first set of navigation interface elements may include a first navigation interface element representing the first portfolio page and a second navigation interface element representing the second portfolio page. The second navigation interface element may further provide access to a third portfolio page of the third portfolio record by virtue of the second portfolio record being concurrently subordinate to the third portfolio record via the second record hierarchy. Operation 208 may be performed by one or more hardware processors configured by machine-readable instructions including a component that is the same as or similar to user interface component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to track and present navigation through records of a collaboration environment, the system comprising:

one or more physical processors configured by machine-readable instructions to:

manage, by a server, environment state information maintaining a collaboration environment, the collaboration environment being configured to facilitate interaction by users with the collaboration environment, the users interacting with the collaboration environment through client computing platforms presenting instances of a graphical user interface of the collaboration environment, the environment state information including records, the records including work unit records, project records, and portfolio records, the work unit records including work unit information associated with units of work managed, created, and/or assigned within the collaboration environment to the users who are expected to accomplish one or more actions to complete the units of work, the project records including project information associated with projects managed within the collaboration environment, the portfolio records including portfolio information associated with portfolios managed within the collaboration environment, wherein the records are associated by record hierarchies, such that individual ones of the record hierarchies specify that individual ones of the work unit records are subordinate to individual ones of the project records, and that the individual ones of the project records and individual ones of the portfolio records are subordinate to other individual ones of the portfolio records, the records including a first portfolio record for a first portfolio, a second portfolio record for a second portfolio, and a third portfolio record for a third portfolio, wherein a first record hierarchy specifies the second portfolio record is subordinate to the first portfolio record, and a second record hierarchy specifies the second portfolio record is concurrently subordinate to the third portfolio record;

establish one or more network connections between the server and the client computing platforms associated with the users;

effectuate communication of user interface information from the server to the client computing platforms over the one or more network connections, the user interface information causing the client computing platforms to present the of instances of the graphical user interface of the collaboration environment, the instances of the graphical user interface displaying user interface pages through which the users view and access the records in the record hierarchies, wherein navigation through the instances of the graphical user interface provides access to different ones of the user interface pages, such that a first instance of the graphical user interface is presented on a first client computing platform associated with a first user, the first instance of the graphical user interface displaying a first portfolio page associated with the first portfolio record;

monitor, by the server, the navigation through the instances of the graphical user interface caused by user input into the instances of the graphical user interface via the client computing platforms, the user input specifying the navigation to the different ones of the user interface pages, such that the user input includes first user input specifying a first user navigation within the first instance of the graphical user interface from the first portfolio page of the first portfolio record to a second portfolio page of the second portfolio record in accordance with the first record hierarchy;

update, by the server, the user interface information to cause the instances of the graphical user interface to be updated to display the user interface pages to which the users have navigated to, such that the first instance of the graphical user interface is updated to display the second portfolio page in response to the first user input;

generate, by the server, navigation history information based on monitoring the user input, the navigation history information identifying an ordered series of the user interface pages navigated to by the users via the instances of the graphical user interface, such that the navigation history information identifies a first ordered series based on the first user navigation, the first ordered series including access to the first portfolio page followed by the second portfolio page; and further update, by the server, the user interface information to cause the instances of the graphical user interface to present navigation interface elements based on the navigation history information, wherein individual ones of the navigation interface elements provide the navigation to individual ones of the user interface pages in the ordered series of the user interface pages in accordance with individual ones of the record hierarchies, and wherein the individual ones of the navigation interface elements further provide the navigation to other ones of the user interface pages for other ones of the records specified within other individual ones of the record hierarchies, such that a first set of navigation interface elements are presented within the first instance of the graphical user interface based on the first ordered series, the first set of navigation interface elements including a first navigation interface element representing the first portfolio page and providing back navigation to the first portfolio page, a second navigation interface element representing the second portfolio page, and a third navigation interface element associated with the second navigation interface element, wherein the third navigation interface element provides forward navigation to a third portfolio page of the third portfolio record not previously navigated to by the first user, wherein the forward navigation to the third portfolio page is provided by virtue of the second portfolio record being concurrently subordinate to the third portfolio record via the second record hierarchy.

2. The system of claim 1, wherein a first user interaction with the second navigation interface element effectuates presentation of a first set of hierarchy navigation interface elements representing the second record hierarchy, wherein the first set of hierarchy navigation interface elements includes the third navigation interface element.

3. The system of claim 2, wherein the first set of hierarchy navigation interface elements provide access to the individual ones of the user interface pages for the records specified within the second record hierarchy.

4. The system of claim 2, wherein the first set of hierarchy navigation interface elements are presented within a drop-down menu.

5. The system of claim 1, wherein the individual ones of the navigation interface elements are selectable within the instances of the graphical user interface, and wherein selection of the individual ones of the navigation interface elements effectuates presentation of the individual ones of the user interface pages corresponding to the individual ones of the records represented by the individual ones of the navigation interface elements.

6. The system of claim 5, wherein the navigation indicates forward navigation through the individual ones of the record hierarchies.

7. The system of claim 6, wherein the selection of the individual ones of the navigation interface elements indicates backward navigation through the individual ones of the record hierarchies.

8. The system of claim 1, wherein the individual ones of the work unit records that are subordinate to the individual ones of the project records directly support fulfillment of the projects corresponding to the individual ones of the project records.

9. The system of claim 1, wherein the individual ones of the project records and the individual ones of the portfolio records that are subordinate to the other individual ones of the portfolio records directly support fulfillment of the individual portfolios corresponding to the other individual ones of the portfolio records.

10. The system of claim 1, wherein the individual ones of the project records and the individual ones of the portfolio records that are subordinate to the other individual ones of the portfolio records indirectly support fulfillment of the individual portfolios corresponding to the other individual ones of the portfolio records.

11. A method to track and present navigation through records of a collaboration environment, the method being implemented in a computer system comprising a server hosting the collaboration environment to client computing platforms associated with users, the method comprising:
managing, by the server, environment state information maintaining the collaboration environment, the collaboration environment being configured to facilitate interaction by users with the collaboration environment, the users interacting with the collaboration environment through the client computing platforms presenting instances of a graphical user interface of the collaboration environment, the environment state information including records, the records including work unit records, project records, and portfolio records, the work unit records including work unit information associated with units of work managed, created, and/or assigned within the collaboration environment to the users who are expected to accomplish one or more actions to complete the units of work, the project records including project information associated with projects managed within the collaboration environment, the portfolio records including portfolio information associated with portfolios managed within the collaboration environment, wherein the records are associated by record hierarchies, such that individual ones of the record hierarchies specify that individual ones of the work unit records are subordinate to individual ones of the project records, and that the individual ones of the project records and individual ones of the portfolio records are subordinate to other individual ones of the portfolio records, the records including a first portfolio record for a first portfolio, a second portfolio record for a second portfolio, and a third portfolio record for a third portfolio, wherein a first record hierarchy specifies the second portfolio record is subordinate to the first portfolio record, and a second record hierarchy specifies the second portfolio record is concurrently subordinate to the third portfolio record;
establishing one or more network connections between the server and the client computing platforms associated with the users;
effectuating communication of user interface information from the server to the client computing platforms over the one or more network connections, the user interface information causing the client computing platforms to present the instances of the graphical user interface of the collaboration environment, the instances of the graphical user interface displaying user interface pages through which the users view and access the records in the record hierarchies, wherein navigation through the instances of the graphical user interface provides access to different ones of the user interface pages, including effectuating presentation of a first instance of the graphical user interface on a first client computing platform associated with a first user, the first instance of the graphical user interface displaying a first portfolio page associated with the first portfolio record;
monitoring, by the server, the navigation through the instances of the graphical user interface caused by user input into the instances of the graphical user interface via the client computing platforms, the user input specifying the navigation to the different ones of the user interface pages, the user input including first user input which specifies a first user navigation within the first instance of the graphical user interface from the first portfolio page of the first portfolio record to a second portfolio page of the second portfolio record in accordance with the first record hierarchy;

updating, by the server, the user interface information to cause the instances of the graphical user interface to be updated to display the user interface pages to which the users have navigated to, including causing the first instance of the graphical user interface to be updated to display the second portfolio page in response to the first user input;

generating, by the server, navigation history information based on the monitoring the user input, the navigation history information identifying an ordered series of the user interface pages navigated to by the users via the instances of the graphical user interface, such that the navigation history information identifies a first ordered series based on the first user navigation, the first ordered series including access to the first portfolio page followed by the second portfolio page; and further updating, by the server, the user interface information to cause the instances of the graphical user interface to present navigation interface elements based on the navigation history information, wherein individual ones of the navigation interface elements provide the navigation access to individual ones of the user interface pages in the ordered series of the user interface pages in accordance with individual ones of the record hierarchies, and wherein the individual ones of the navigation interface elements further provide the navigation to other ones of the user interface pages for other ones of the records specified within other individual ones of the record hierarchies, such that a first set of navigation interface elements are presented within the first instance of the graphical user interface based on the first ordered series, the first set of navigation interface elements including a first navigation interface element representing the first portfolio page and providing back navigation to the first portfolio page, a second navigation interface element representing the second portfolio page, and a third navigation interface element associated with the second navigation interface element, wherein the third navigation interface element provides forward navigation to a third portfolio page of the third portfolio record not previously navigated to by the first user, wherein the forward navigation to the third portfolio page is provided by virtue of the second portfolio record being concurrently subordinate to the third portfolio record via the second record hierarchy.

12. The method of claim 11, wherein a first user interaction with the second navigation interface element effectuates presentation of a first set of hierarchy navigation interface elements representing the second record hierarchy, wherein the first set of hierarchy navigation interface elements includes the third navigation interface element.

13. The method of claim 12, wherein the first set of hierarchy navigation interface elements provide access to the individual ones of the user interface pages for the records specified within the second record hierarchy.

14. The method of claim 13, wherein the first set of hierarchy navigation interface elements are presented within a drop-down menu.

15. The method of claim 11, wherein the individual ones of the navigation interface elements are selectable within the instances of the graphical user interface, and wherein selection of the individual ones of the navigation interface elements effectuates presentation of the individual ones of the user interface pages corresponding to the individual ones of the records represented by the individual ones of the navigation interface elements.

16. The method of claim 15, wherein the navigation indicates forward navigation through the individual ones of the record hierarchies.

17. The method of claim 16, wherein the selection of the individual ones of the navigation interface elements indicates backward navigation through the individual ones of the record hierarchies.

18. The method of claim 11, wherein the individual ones of the work unit records that are subordinate to the individual ones of the project records directly support fulfillment of the projects corresponding to the individual ones of the project records.

19. The method of claim 11, wherein the individual ones of the project records and the individual ones of the portfolio records that are subordinate to the other individual ones of the portfolio records directly support fulfillment of the individual portfolios corresponding to the other individual ones of the portfolio records.

20. The method of claim 11, wherein the individual ones of the project records and the individual ones of the portfolio records that are subordinate to the other individual ones of the portfolio records indirectly support fulfillment of the individual portfolios corresponding to the other individual ones of the portfolio records.

* * * * *